United States Patent [19]

Yoshizawa et al.

[11] Patent Number: 5,518,834
[45] Date of Patent: May 21, 1996

[54] CYLINDRICAL AIR-CELL

[75] Inventors: Hiroshi Yoshizawa, Katano; Isao Kubo, Kadoma; Shigeto Noya, Neyagawa; Takafumi Fujiwara, Moriguchi; Akira Miura, Katano; Nobuo Eda, Hirakata, all of Japan

[73] Assignee: Matsushita Electric Industrial Co., Ltd., Osaka, Japan

[21] Appl. No.: 355,600

[22] Filed: Dec. 14, 1994

[30] Foreign Application Priority Data

| Dec. 14, 1993 | [JP] | Japan | 5-313156 |
| Jan. 27, 1994 | [JP] | Japan | 6-007341 |
| Feb. 2, 1994 | [JP] | Japan | 6-010940 |
| Feb. 4, 1994 | [JP] | Japan | 6-012042 |
| Feb. 16, 1994 | [JP] | Japan | 6-019116 |
| Feb. 21, 1994 | [JP] | Japan | 6-022281 |
| Feb. 28, 1994 | [JP] | Japan | 6-029567 |
| Oct. 5, 1994 | [JP] | Japan | 6-241231 |
| Nov. 17, 1994 | [JP] | Japan | 6-283353 |

[51] Int. Cl.⁶ .................................................. H01M 10/34
[52] U.S. Cl. ........................ 429/59; 429/94; 429/101; 429/170; 429/171; 429/174; 429/180; 429/185
[58] Field of Search ..................... 429/59, 101, 94, 429/129, 133, 140, 141, 170, 171, 174, 180, 185, 218

[56] References Cited

U.S. PATENT DOCUMENTS

| 4,666,799 | 5/1987 | Runquist et al. | 429/101 |
| 4,756,983 | 7/1988 | Tucholski | 429/59 |
| 4,816,355 | 3/1989 | Kulibert et al. | 429/174 |
| 4,971,867 | 11/1990 | Watanabe et al. | 429/94 |
| 5,008,161 | 4/1991 | Johnston | 429/94 |

FOREIGN PATENT DOCUMENTS 47-25127  11/1972  Japan .
58-89772  5/1983  Japan .

*Primary Examiner*—Bruce F. Bell
*Attorney, Agent, or Firm*—Ratner & Prestia

[57] ABSTRACT

The sealing of the top and/or bottom of the cylindrical positive electrode of an air-cell is improved and leakage of the electrolyte from the jellied zinc negative electrode disposed within the positive electrode which is constituted of a collector layer, catalyst layer, and a porous layer is prevented. By utilizing a positive electrode constituted of a metallic collector layer made of a metal mesh or such, a catalyst layer disposed around said collector, and a fluororesin porous layer as an air diffusion layer, an outer cup and an inner cup are pressed on the top of the positive electrode in order to prevent the leakage of the electrolyte. The possible leakage of electrolyte from the bottom of the positive electrode can be prevented by providing a resin sealing body with a ring shaped indentation fitted to the bottom of a positive electrode, and by inserting this resin sealing body into the positive electrode cannister, and by pressing the side wall of the positive electrode cannister against the side of the resin sealing body, in order to fit the bottom of the positive electrode to the indentation of the resin sealing body.

27 Claims, 9 Drawing Sheets

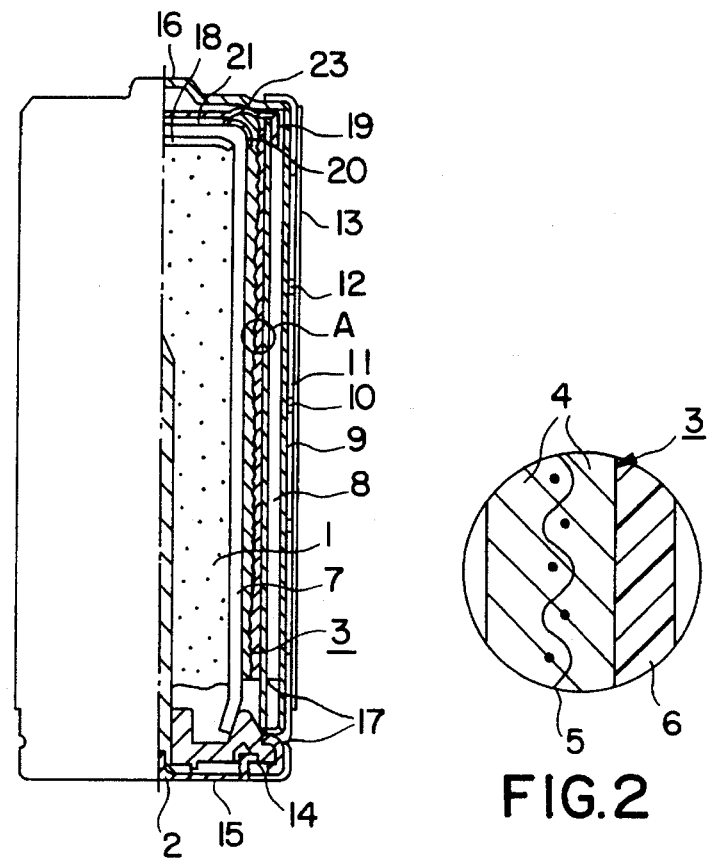
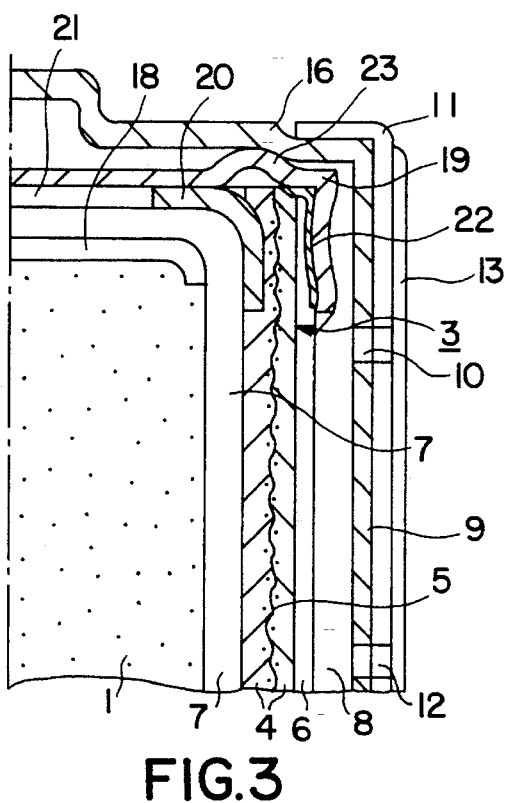
FIG. 1
FIG. 2
FIG. 3

CYLINDRICAL AIR-CELL

FIELD OF THE INVENTION

This invention relates to a cylindrical air-cell of which top of positive electrode containing electrolyte and cathode active material or sealing of the bottom of said air-cell is made liquid tight.

BACKGROUND OF THE INVENTION

A structure of conventional cylindrical air-cell is explained below by referring FIG. 14 which shows a partly cutout side view of said air-cell. In FIG. 14, 101 is a cylindrical negative electrode containing an active material of so-called "jellied zinc" in which zinc powder is dispersed in jellied electrolyte, and 102 is a collector provided at the center of negative electrode 101. 103 is a multi-layered cylindrical positive electrode comprised of catalyst layer 104 containing manganese oxide and carbon material, collector layer 105 buried within catalyst layer 104, and a water-repellant porous layer 106 made of fluororesin contacting with a surface of catalyst layer 104.

The other surface of said catalyst layer 104 is faced to negative electrode 102 through separator 107, and is operated by utilizing the oxygen contained in air as an active material. 108 is a cylindrical positive electrode-can containing air-diffusing layer made of non-woven fabric covering the surface of said positive electrode 103, and other electricity generating elements including negative electrode 101 and positive electrode 103, and is provided with air-intake hole 110. 111 is an insulation tube covering the entire surface of said cylindrical positive electrode can 109, provided with air-intake hole 110 and air-intake window 112 which are connected to said air-intake hole 110.

113 is a seal closing said air-intake window 112 and 114 is a resin seal to which the bottom of positive electrode can 109 is bent and clamped. 115 is a bottom plate of the negative electrode terminal contacted with collector 102, 116 is a positive electrode cap-terminal contacted with the top of positive electrode 103, 117 is a cell cover, 118 is a grooved part, and 119 is a sealing material preventing the leakage of electrolyte.

Explaining this cell structure further, the upper edge of positive electrode 103 is inwardly bent at the rim of grooved part 118, and the bent part is contacted with the rim of positive electrode cap-terminal 118, and these are inserted into cell-cover 117, and the upper edge of positive electrode canister 109 is bent and clamped at the rim of cell-cover 117. The lower edge of positive electrode 103 is sealed by inserting the bottom of water repellant porous layer 106 of positive electrode 103 between the sealing body 114 and the positive electrode canister 109, and clamped.

By employing the above explained cell-structure, leakage of jellied electrolyte filled within the cylindrical positive electrode 103 and leakage of electrolyte containing the zinc powder filled in the negative electrode from the top to the bottom end of positive electrode canister 109 can be prevented.

However, when the top end of cylindrical positive electrode 103 consisted of collector 105, catalyst layer 104, and water repellant porous layer 106, is bent at a rim of groove 118 provided for the sealing, cracks of catalyst layer 104 may apt to be produced at the bending or wrinkles of water-repellant porous layer 108 are apt to take place, and as a result of this, complete seal of cell-cover 117 had been hard to accomplish.

Furthermore, since the sealing of bottom edge of positive electrode canister 109 is performed by clamping only the edge of water repellent porous layer 106 between the sealing body 114 and the positive electrode canister 109, cracks of edge of water repellent porous layer 108 are apt to be produced so that perfect seal had been hard to obtain.

Since the alkaline electrolyte has a strong tendency of creeping and leakage through minute wrinkles or cracks of seal if produced, leakage of electrolyte may take place easily during the storage period or during the usage thereof.

Moreover, the conduction from positive electrode 103 to positive electrode canister 109 is performed by the mechanical contact of positive electrode 103 and positive electrode cap terminal 116 accomplished by the bending of the top rim of positive electrode canister 109, these con,acts may become unstable by vibration or shock applied on the cell, making the electric-current supply unstable.

SUMMARY OF THE INVENTION

The purpose of this invention is to offer a new air-cell structure by which the top and bottom of the cylindrical positive electrode consisted of collector and catalyst layers and water-repellent porous layer are sealed liquid tight, preventing the external leakage of electrolyte held within the positive electrode.

In order to accomplish the present purposes, the cylindrical multi-layer positive electrode of the invented air-cell is constituted of a metallic collector, catalyst layers disposed on both sides of said metallic collector, and a porous layer disposed on said catalyst layer wherein an external cup and an internal cup are pressed on the external top rim of said porous layer and internal top rim of catalyst layer of said positive electrode respectively.

Moreover, as a metallic collector constituting said positive electrode, a cylindrical metallic collector layer of which top is inwardly bent can be employed, and said external metal cup pressed on the external top rim of said porous layer and said internal metal cup pressed on the internal top rim of catalyst layer are closely contacted on said inwardly bent part of said metallic collector.

Likewise, said cylindrical positive electrode may well be constituted of a gas diffusion layer disposed on the outer surface of said catalyst layer and a porous layer disposed on the outer surface of said gas diffusion layer, and a cap-shaped external metal cup may be pressed on the external top rims of said porous layer and a cap-shaped internal metal cup may be pressed on the internal top rim of said catalyst layer respectively, though said the bent part of said metallic collector may well be held and clamped between said external and internal metal cups.

In another structure of the invented air-cell, a metallic external cup is disposed on the outer top rim of said porous layer, a metallic external cup is disposed on the internal top rim of said catalyst layer of said positive electrode, said positive electrode is inserted in a cylindrical positive electrode canister, and then the said outer metallic cup is welded to said terminal, and the outer rim of said outer cup positioned outside of the welded part of said outer cup and said terminal and the internal surface of said positive electrode canister facing to the outer rim of said outer cup can be electrically insulated. In this case, a metallic collector layer of which top rim is bent inwardly, may be used.

In the still other structure of the invented air-cell, a resin seal provided with a ring-shaped indentation fitted to the bottom of said positive electrode is used as a bottom seal of said positive electrode. In this case, the bottom of said positive electrode is inserted in said ring-shaped indentation, and said resin seal is inserted in said positive electrode canister. After this, the side or resin seal is so pressed against the opposing inner wall of the positive-electrode canister that the bottom of positive electrode and the indentation of resin seal are contacted closely.

Moreover, in another structure of the invented air-cell, said resin seal provided with a ring-shaped indentation to which the bottom of separator disposed on the positive electrode or on the inner wall of positive electrode is fitted, can be employed.

In still another structure of the invented air-cell, said resin seal may well be constituted of two elements, i.e., a seal provided with a ring-shaped indentation fitted to the bottom of said positive electrode or an indentation fitted to both the bottoms of positive electrode and said separator, and an independent seal by which this seal can be held.

According to the above described explanations, the functions of the inventions are as follows.

The top of a positive electrode consists of a metallic collector layer, a catalyst layer disposed on the side of said collector layer, and a porous layer held between two metal cups of different inner diameters, and the sides of said metal cups are pressed against said positive electrode, and by this, the top of said positive electrode can be completely sealed without producing cracks or wrinkles possible on said positive electrode so that the leakage of electrolyte from the top of positive electrode can be completely prevented.

In another case, a high electrical conductivity between the positive electrode and the metal cups can be obtained by employing a cylindrical collector layer of which top rim is inwardly bent, and by welding the bent rim to the inner wall of said outer cup, and by pressing said outer cup and inner cup to said bent rim of collector. Moreover, a high electrical conductivity or low internal cell resistance can be obtained by welding the top of said outer cup to the inner wall of said positive electrode canister, preventing contact failures between the collector and the cups even if unexpected shocks or vibration are applied to the cell.

Moreover, tile bottom of positive electrode can be sealed completely by pressing the bottom of positive electrode against the indentation of resin sealing, and by applying a mechanical pressure on the positive electrode canister at the side of indentation after the bottom of positive electrode is inserted into the indentation of resin seal.

Furthermore, by inserting the bottom of separator into the indentation of resin seal, not only the excessive stress application on the positive electrode at sealing process can be avoided, but the sealing performance can also be improved. Thus, the leakage of electrolyte and the shorts between the positive and the negative electrodes can be prevented improving the cell reliability further.

BRIEF DESCRIPTION OF THE DRAWINGS

FIG. 1 shows a side view of the partly cut-off cylindrical zinc air-cell which is a first embodiment of the invention.

FIG. 2 shows an enlargement of the part-A of FIG. 1.

FIG. 3 shows an enlarged cross-section of the top edge of modified positive-electrode of the cylindrical zinc air-cell shown in FIG. 1.

DESCRIPTION OF THE PREFERRED EMBODIMENTS (Embodiment-1)

Figure 4:
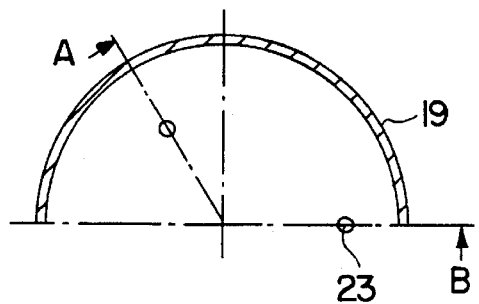
FIG. 4 shows a top view of the outer cup of cylindrical zinc air-cell shown in FIG. 1.

FIG. 1 shows a side view of the partly cut-off cylindrical zinc air-cell which is a first embodiment of the invention, FIG. 2 shows an enlargement of the part-A of FIG. 1, and FIG. 3 shows an enlarged cross-section of the top end of modified positive electrode of the cylindrical zinc air-cell shown in FIG. 1.

In FIGS. 1 to 3, 1 is a cylindrical negative electrode in which an active material of so-called jellied zinc and collector 2 are incorporated, 3 is a multilayered cylindrical positive electrode comprised of a catalyst layer 4 employing manganese oxide and carbon materials as main elements, collector layer 5 consisted of nickel plated stainless steel mesh disposed within catalyst layer 4, and a water-repellant porous layer 6 consisted of fluororesin contacting with a surface of catalyst layer 4, 7 is a separator disposed within catalyst layer 4 of positive electrode 3, within which negative electrode 1 is disposed, 8 is an air diffusion layer made of non-woven polypropylene fabric, 9 is a positive electrode canister on which positive electrode cap terminal 16 is integrally molded at its top, 10 is an air-intake hole provided on the positive electrode canister 9, 11 is an insulation tube, 12 is an air-intake window provided on insulation tube 11, 13 is a seal sealing the air-intake window until the cell operation, 14 is a seal made of resin, 15 is a bottom plate for negative electrode terminal, 17 is a sealing material, and 18 is a base paper. In place of metal mesh, an expanded metal or a punched metal may be used.

The manufacturing process of positive electrode 3, is began with a spot welding process overlapping the both ends of long collector layer forming collector 5 into a cylindrical shape and placing the overlapped part at a surface common with the side surface of collector 5, and a preformed catalyst layer 4 is then pressed on the both surfaces of cylinder-shaped collector 5.

The material of catalyst layer 4 is prepared by mixing activated carbon, manganese oxide, acetylene-black, and fluororesin powder at a predetermined mixing ratio, and by further kneading of the mixture after a proper amount of ethylalcohol is added. Then, this kneaded mixture is extruded into a strip sheet having a thickness of about 0.6 mm. Said manganese oxide is prepared by applying a heat-treatment on γ-MnOOH in a nitrogen atmosphere at a temperature of 400° C., and said fluororesin powder is derived from polytetrafluoroethylene (PTFE) resin. Granulated or chained activated carbon having a particle diameter or 10 to 40 microns is used in this case.

On the other hand, a fluororesin dispersant containing PTFE resin is coated on a surface of catalyst layer 4 and is dried at a temperature of 230° C. By this, the electrolyte can be easily permeated into the electrode, and obstruction of oxygen gas supply to the positive electrode can be prevented. The reason of the employment of a drying temperature of 230° C. is to disperse the surface active agent contained in the dispersant.

A gas-permeable water-repellant fluororesin layer is then pressed on the surface coated with fluororesin dispersant in order to obtain porous layer 6 of positive electrode 3 act as an air electrode. Thus prepared positive electrode 3 is wound Involute in a form of cylinder to face catalyst layer 4 inwardly.

Then, inner cup 20 and outer cups 19 both made of nickel plated steel plate are disposed on the top of cylindrical positive electrode 3, so that outer cup 19 is contacted with the outer rim while inner cup 20 is contacted with tile inner rim of the top edge of said porous layer 5. As a result of this, positive electrode 3 can be sealed at a condition where the top edge of positive electrode 3 is held between the outer cup 19 and inner cup 20. Since the outside of outer cup rim is grooved by using a roller and is pressed against the outer surface of positive electrode 3 while inner cup 20 is widened within a space of catalyst layer 4 and pressed against the inner wall of positive electrode 3, positive electrode 8 is held and clamped between the inner cup 20 and the outer cup 19 forming an air-tight and leakage-free sealing.

Furthermore, as shown in FIG. 3, the entire inner surface of outer cup 19 is coated with a synthetic rubber sealing material made mainly of chlorosulfonated-polyethylene for example forming a sealing layer 22, in order to improve the air-tightness and leakage-proof performance realizing high reliability of the sealing.

Thus, after sealing the top of positive electrode 3, the external surface of porous layer 6 and the area from the outer rim of outer cup 19 to the upper round-off part are wrapped by air-diffusion layer 8.

Figure 5:
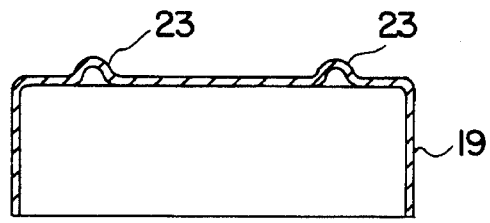
FIG. 5 shows a cross-section of the outer cup of cylindrical zinc air-cell shown in FIG. 4, sectioned at Line A—B.

As shown in FIGS. 4 and 5, small protrusions 23 are disposed on the external top surface of outer cup 19 at three points avoiding a straight line disposition, and these small protrusions 23 are spot-welded on the inner surface of terminal 16 of positive electrode cap, disposed on the top of positive electrode canister 9.

Moreover, the top of said air-diffusion layer 8 is disposed between the outer rim of outer cup 19 located outside of said small protrusions 23 and the inner side surface of positive electrode canister 9 opposing to these protrusions in order to avoid the contact of outer cup 19 to positive electrode canister 9.

By employing the above-described cell construction, since the eddy current produced at welding of small protrusions onto the top inner surface of positive electrode canister 9 is concentrated only to the small protrusions of outer cup 19, a higher welding strength and better appearance welding between the positive electrode canister 9 and the small protrusions can be obtained. Moreover, because of an opening 21 provided on the top center of inner cup 20, a welding rod can be inserted through opening 21 when positive electrode canister 9 is welded to the outer cup 19 so that the welding bar can be contacted with outer cup 19 and the welding of these components can be performed easily at a better stabilized condition.

Furthermore, instead of the non-woven fabric, air diffusion layer 8 covering the outside surface of porous layer 6 and the area from the outer side surface to the top of cup 19 can be formed by using a heat-shrinking porous resin tube made of a resin material such as air-permeable polyethylene terephthalate (PET) or a heat shrinking tube with small openings prepared in advance.

The bottom edge of positive electrode 3 is formed by bending the bottom edge of positive electrode 9 against the rim of sealing body 14 and by clamping, and by placing the lower edge of porous layer 6 between the sealing body 14 and the positive electrode canister 9 and by filling the gap with a sealing material 17.

Figure 14:
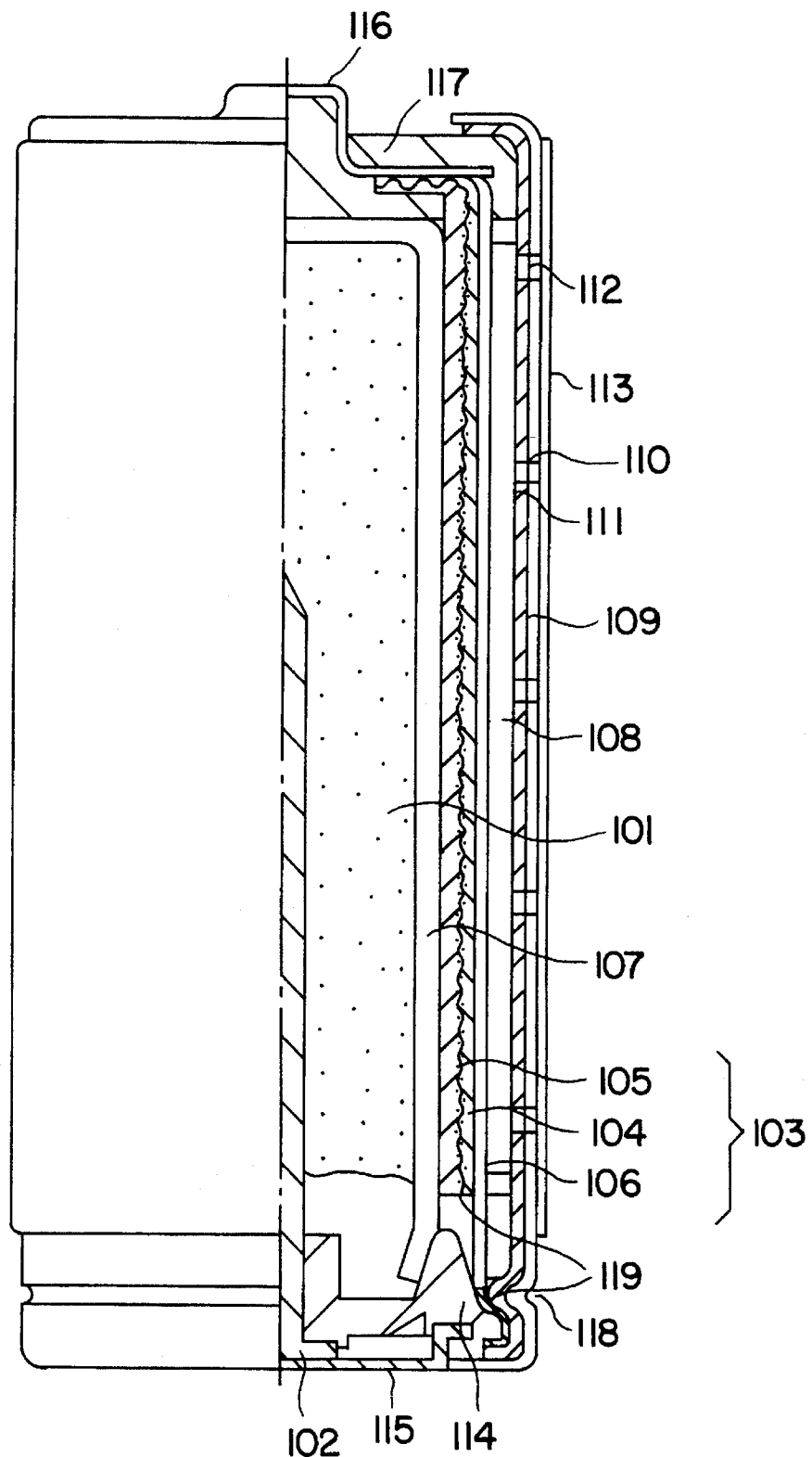
FIG. 14 shows a side view of the partly cut-off conventional cylindrical zinc air-cell.

Ten of the cylindrical zinc air-cells A are constructed according to Embodiment-1 shown in FIG. 1, ten conventional cylindrical zinc air-cells C are constructed by bending the top edge of positive electrode inwardly and contacted with the bent part as shown in FIG. 14. Ten cylindrical zinc air-cells B are constructed according to Embodiment-1 shown in FIG. 3 but with sealing layer 22 is formed on the inner surface of outer cup 19, and ten conventional cylindrical zinc air-cells D with sealing layer 22 formed at the top edge of positive electrode, are prepared.

The storage characteristics of those cells are comparatively tested at a storage temperature of 60° C. and the result of these are shown in Table 1.

TABLE 1

| Tested cells | Sealing applied on outer cup | Storage Period (at 60° C.) | | | |
|---|---|---|---|---|---|
| | | 1 week | 2 weeks | 3 weeks | 1 month |
| Cell A (FIG. 1) | None | 2/10 | 8/10 | 10/10 | — |
| Cell B (FIG. 3) | Yes | 0/10 | 0/10 | 0/10 | 0/10 |
| Cell C (conventional) | None | 10/10 | — | — | — |
| Cell D (conventional) | Yes | 10/10 | — | — | — |

As shown in Table 1, the conventional zinc air-cells C and D showed very severe electrolyte leakages within very short periods, regardless of the coating of sealing material.

On the other hand, none of the zinc air-cells B of Embodiment-1 showed leakage after a storage period of one month at 60° C. while all of the zinc air-cells A showed leakage after a storage period of three weeks.

Therefore, significant improvements of leakage stopping characteristics obtained by the invented zinc air-cells over those of conventional zinc air-cells are confirmed, in addition to further improvements obtained with sealing layer 22 formed on the internal surface of outer cup 19.

However, when the width of overlapped region of the cylindrically formed collector is inadequate, an insufficient tensile strength of the overlapped region would be produced.

Therefore, when a volume expansion of the zinc negative electrode 1 is produced at discharge, breakage of welded points at the edges of collector may take place, causing electrolyte leakage. Thus, at least an overlap width of 1.3% of the circumference of collector layer 5 has to be provided.

On the other hand, when said overlapped width is too large, the collector area providing minute holes are plugged, sacrificing the discharge capacity somewhat. The sacrifice of discharge capacity can be minimized by setting the overlapped width at less than 9% of the total circumference of collector layer 5.

Although a case where the both ends of long stainless steel mesh strip are over-lapped to constitute a cylindrical collector is shown here, the collector of the same function can be obtained by weaving a long horizontal metal thread into a number of independent vertical fine metal wires formed into a shape of cylinder.

Both the horizontal and vertical metal wires in this case, could be nickel plated stainless steel wire or nickel wire, and in this case, erosion of collector by the alkaline electrolyte can be minimized so that the storage characteristics of cell can he improved.

(Embodiment-2)

Figure 6:
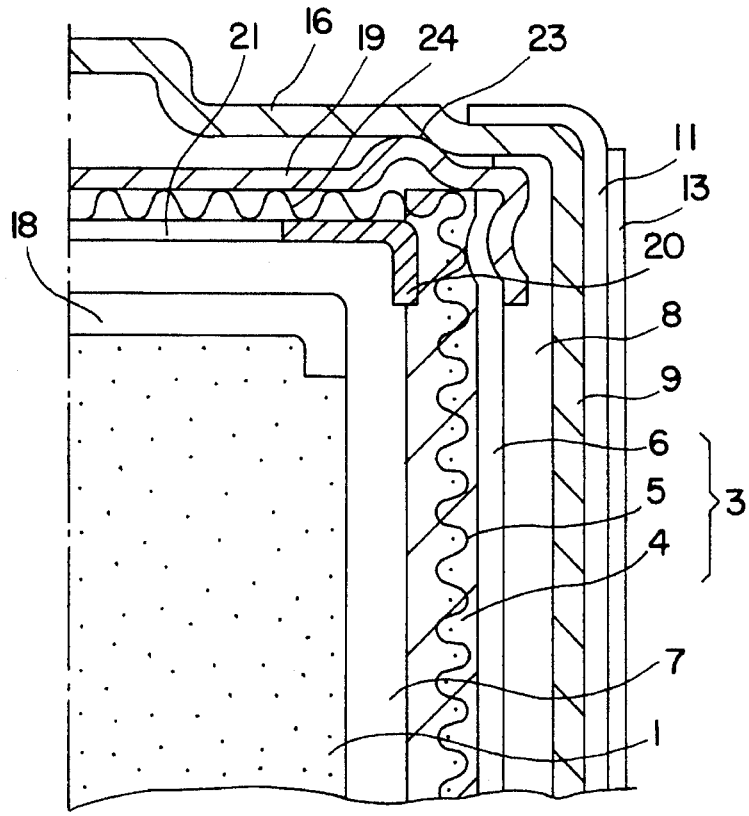
FIG. 6 shows an enlarged cross-section of tile top edge of positive electrode of the cylindrical zinc air-cell which is a second embodiment of the invention.

A bent part 24 formed by bending the top edge inwardly is provided on cylindrical collector 5 as shown in FIG. 6. By pressing and fitting outer cup 19 onto both the upper surface of bent part 24 and the upper edge rim of porous layer 6, and by pressing and fitting the inner cup 20 onto both the lower surface of bent part 24 and the inner rim of upper edge of catalyst layer 4, the bent part 24 can be held and clamped between the inner cup 19 and the outer cup 20. At this condition, outer cup 19 and bent part 24 can be welded together. A cylindrical air-cell according to the above shown cell construction yet having a cell construction identical with those shown in FIG. 1 for the rest of the cell, is fabricated, and this cell is named as cell E of the embodiment of the invention.

Ten each of Cells E and A are prepared and the internal cell resistances are determined, and the results of these are listed in Table 2.

TABLE 2

|  |  | Right after cell assembly (in Ω) |  | After 20 day storage at 60° C. (in Ω) |
| --- | --- | --- | --- | --- |
| Invented Cell-E | x | 0.154 | x | 0.186 |
| (FIG. 6) | Max | 0.17 | Max | 0.20 |
|  | Min | 0.14 | Min | 0.1.6 |
|  | $\sigma_{n-1}$ | 0.010 | $\sigma_{n-1}$ | 0.015 |
| Invented Cell-A | x | 0.216 | x | 0.352 |
| (FIG. 1) | Max | 0.27 | Max | 0.37 |
|  | Min | 0.18 | Min | 0.31 |
|  | $\sigma_{n-1}$ | 0.216 | $\sigma_{n-1}$ | 0.024 |

As shown in Table 2, substantial decreases of the internal resistance resulted from the closer contacts of bent part 24 of collector layer 5 to outer cup 19 and inner cup 20 is proved by cell E which is an embodiment of the invention.

This result proved that the internal resistance can be kept at low even after a storage period of 20 days at 60° C. The advantages of cell E have been confirmed with the cells assembled by using no welding of bent part 24 to collector layer 5 but is merely held between these two elements.

(Embodiment-3)

Figure 7:
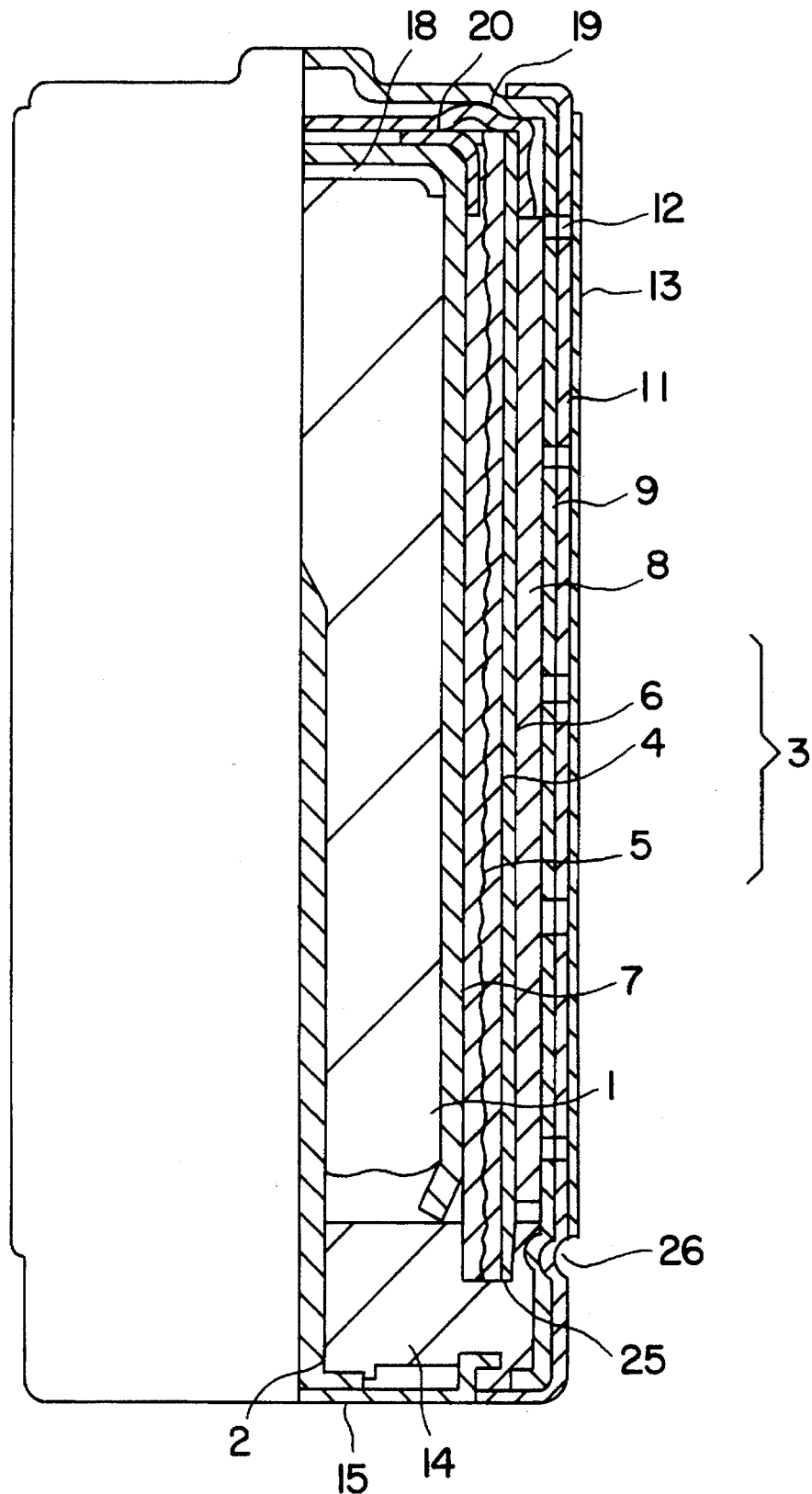
FIG. 7 shows a side view of the partly cut-off cylindrical zinc air-cell which is a third embodiment of the invention.

Resin sealing body 14 sealing the bottom of cylindrical positive electrode 3 liquid tight, may be provided with a ring-shaped indentation 25 to which the bottom of positive electrode 3 is fitted as shown in FIG. 7. After sealing body 14 provided with indentation 14 to which the bottom of positive electrode is fitted, is inserted into positive electrode canister 9, groove 26 is formed on the side wall of positive electrode canister 9 by applying an external mechanical pressure on sealing body 14.

By this, the side wall of sealing body 14 is pressed closely against positive electrode canister 9 and at the same time, the lower edge of positive electrode 3 is fitted liquid tight to indentation 25 of sealing body 14, sealing the bottom of positive electrode 3 completely.

In addition to the above, the sealing condition of the bottom of positive electrode canister can be further improved by applying a sealing agent in a gap between the side of resin sealing body 14 and the side of positive electrode canister. The zinc air-cell assembled by using the above-explained sealing body 25 is named as cell F is shown in FIG. 7. Ten each cells F and C are assembled and these are submitted to comparative three-month storage tests conducted at a temperature of 60° C. testing the leakage from the bottom of positive electrodes 3, and the results are tabulated in Table 3.

TABLE 3

|  | Storage Period (at 60° C.) | | | | |
| --- | --- | --- | --- | --- | --- |
| Tested cells | 10 days | 20 days | 1 month | 2 months | 3 months |
| Cell F | 0/10 | 0/10 | 0/10 | 0/10 | 0/10 |
| Cell G | 0/10 | 0/10 | 0/10 | 0/10 | 0/10 |
| Cell H | 0/10 | 0/10 | 0/10 | 0/10 | 0/10 |
| Cell I | 0/10 | 0/10 | 0/10 | 0/10 | 0/10 |
| Conventional Cell C | 10/10 | — | — | — | — |

As shown in Table 3, as for the ten F cells which are an embodiment of the invention, no leakage have been detected even after a three month storage period conducted at a temperature of 60° C.

(Embodiment-4)

Figure 8:
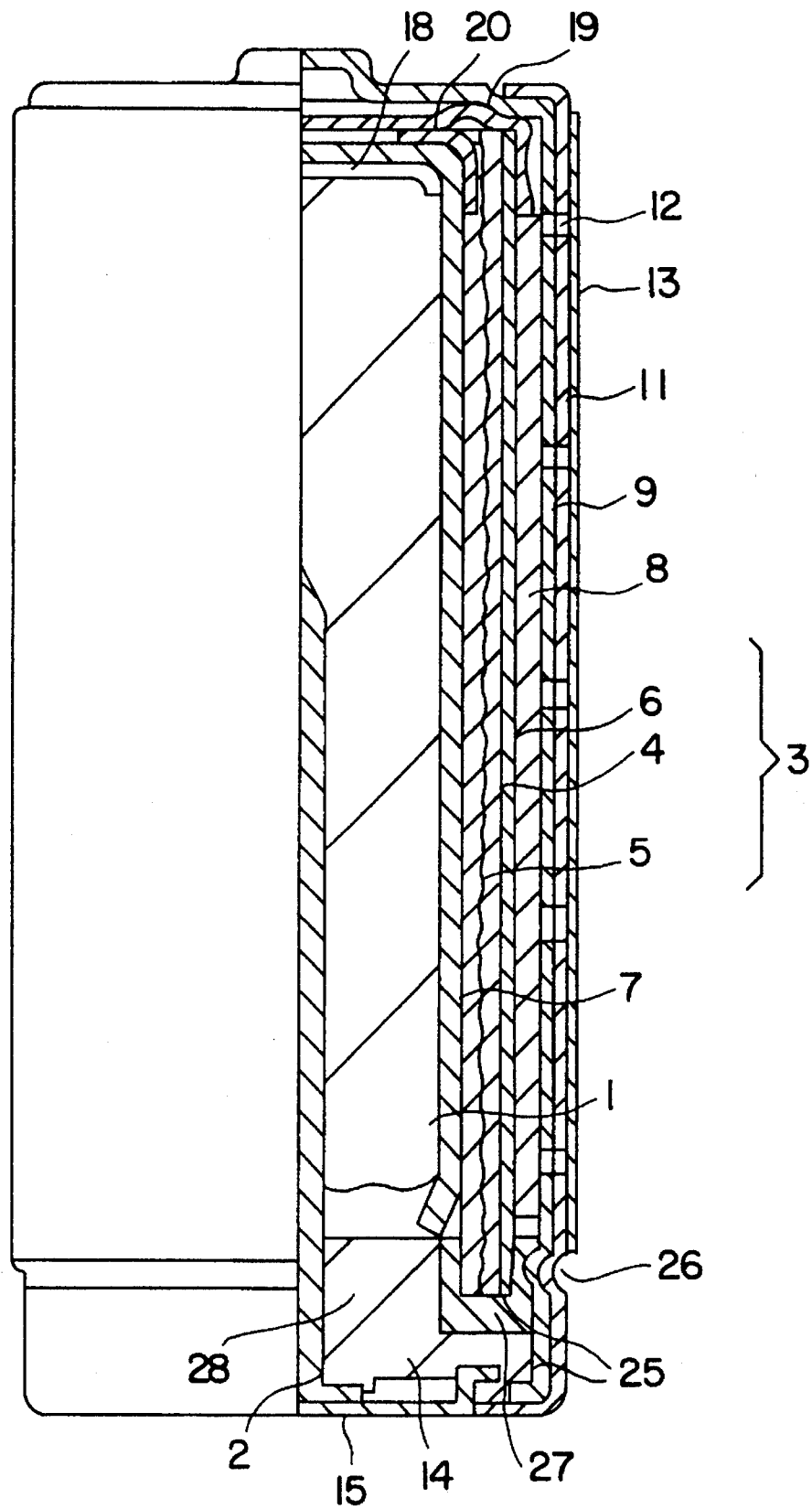
FIG. 8 shows a side view of the partly cut-off cylindrical zinc air-cell which is a fourth embodiment of the invention.

As shown in FIG. 8, resin sealing body 14 may be constituted of a ring-shaped resin mold element 27 provided with indentation 25 to which the bottom of positive electrode 3 is fitted, and a convex resin mold element 28 holding said resin mold element 27.

The zinc air-cell assembled by employing sealing body 14 of this construction is named as cell G which is an embodiment of the invention and is shown in FIG. 8.

Table 3 shows a result of the storage test same as tile case of Embodiment-3 conducted by using cell G. Likewise, no cell leakage have been found even after three month storage period conducted at a temperature of 60° C.

(Embodiment-5)

Figure 9:
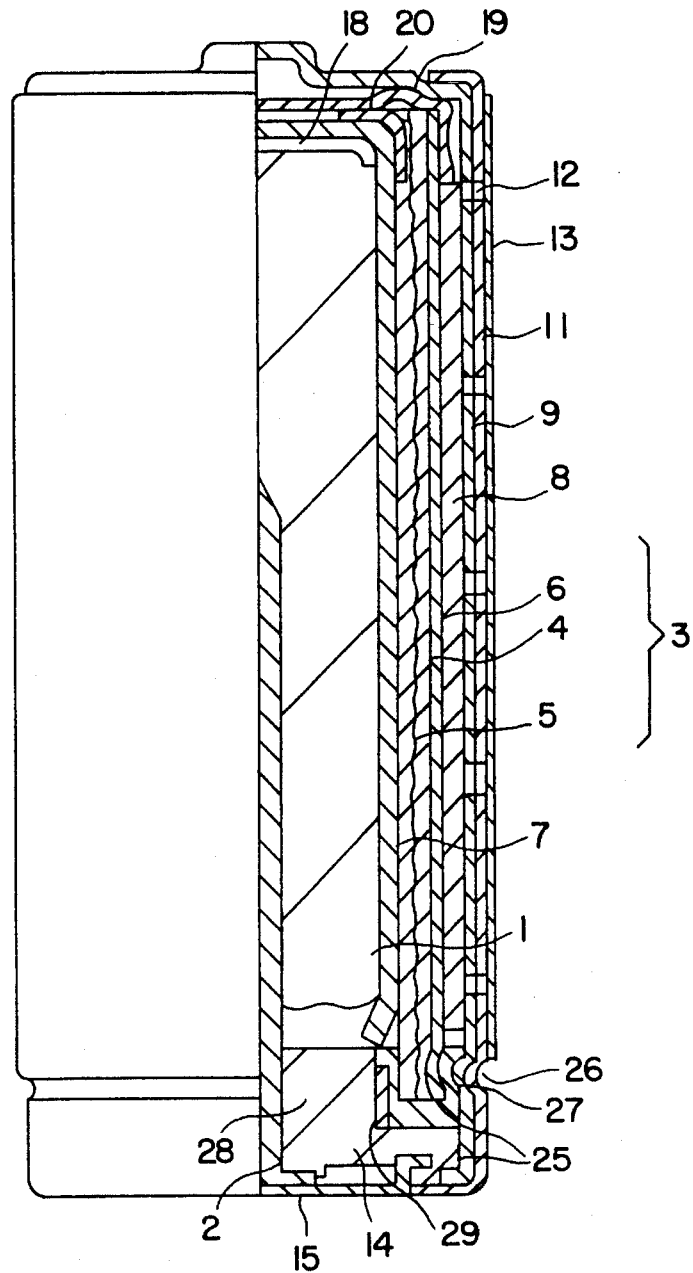
FIG. 9 shows a side view of the partly cut-off zinc cylindrical air-cell which is a fifth embodiment of the invention.

As shown in FIG. 9, metal ring 29 may be disposed between the resin mold element 27 and resin mold body 28 in Embodiment-4. The cylindrical air-cell assembled by using the thus constructed sealing body 14 is designated as cell H of Embodiment-5 of the invention, and this is shown in FIG. 9.

The results of the test of cell H, conducted under a condition same as the one in Embodiment-3 is shown in Table 3 which shows no leaked cells after a three month storage test conducted at a temperature of 60° C.

Moreover, in the cased of Embodiments -4 and -5. the work to insert the bottom of positive electrode into indentation 25 can be simplified and easier by making the ring-shaped indentation 25 of resin mold element 27 in a form of tapered side-wall 30 which is expanded gradually upward.

When the cylindrical zinc air-cell of the invention is assembled by using the above explained sealing body 14, after air diffusion layer 8 is disposed on the outside of positive electrode 3 to which outer cup 19 and inner cup 20 are fitted to the top of said positive electrode, these are inserted into positive electrode canister 9, the bottom or positive electrode 3 is inserted into indentation 25 of said resin mold element 27, and the concave metal-ring holding part 31 provided on the side of resin mold element 27 is positioned at metal ring 29.

Then, by using a roller, a mechanical pressure is applied on the side of positive electrode canister 9 facing to the side of resin mold element 27, and by this groove 26 is formed. Although a pressure is applied on both the resin mold element 27 and the positive electrode canister 9, movements of resin mold element 27 in the direction of pressure application can be blocked by means of metal ring 29, and the sealing between the resin mold element 27 and the bottom of positive electrode 3 can be further improved.

Figure 10:
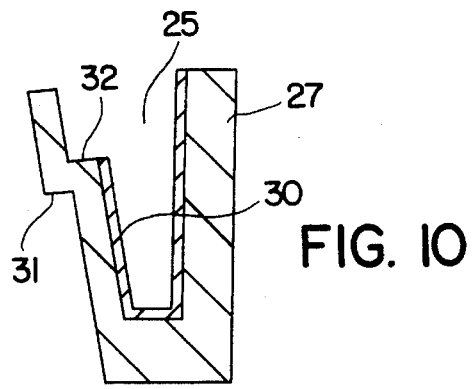
FIG. 10 shows a side cross-section of the ring-shaped resin mold employed in the cylindrical air-cell shown in FIG. 9.
Figure 11:
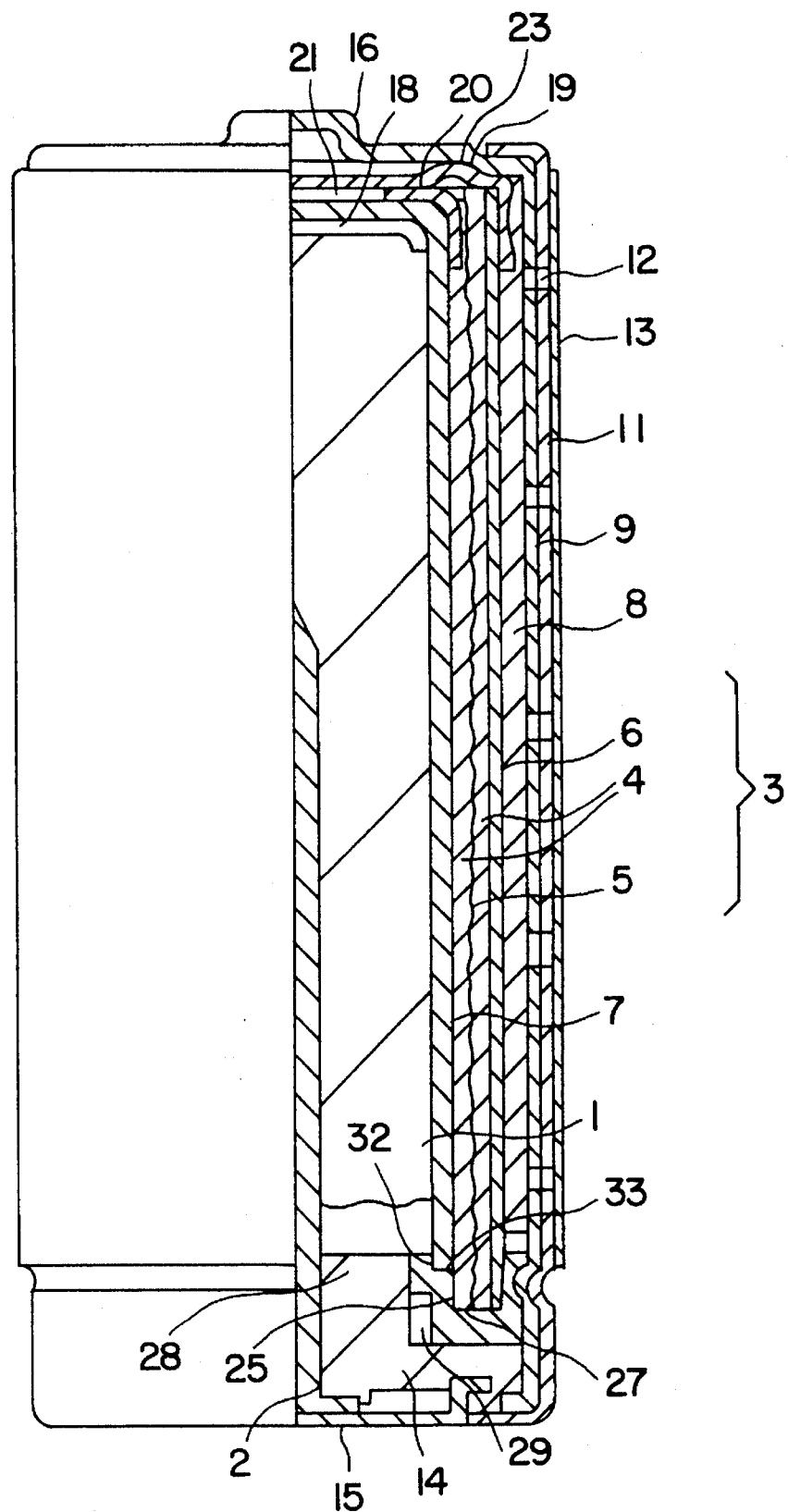
FIG. 11 shows a side view of the partly cut-off modified cylindrical zinc air-cell which is a fifth embodiment of the invention.

By providing step part 32 at the upper part of the inner sidewall of indentation 25 as shown in FIG. 10 in order to hold the lower edge 33 of separator 7, a cell structure shown in FIG. 11 can be obtained, and the possibility of shorts between the positive electrode 3 and the negative electrode 1 can be completely eliminated.

(Embodiment-6)

Figure 12:
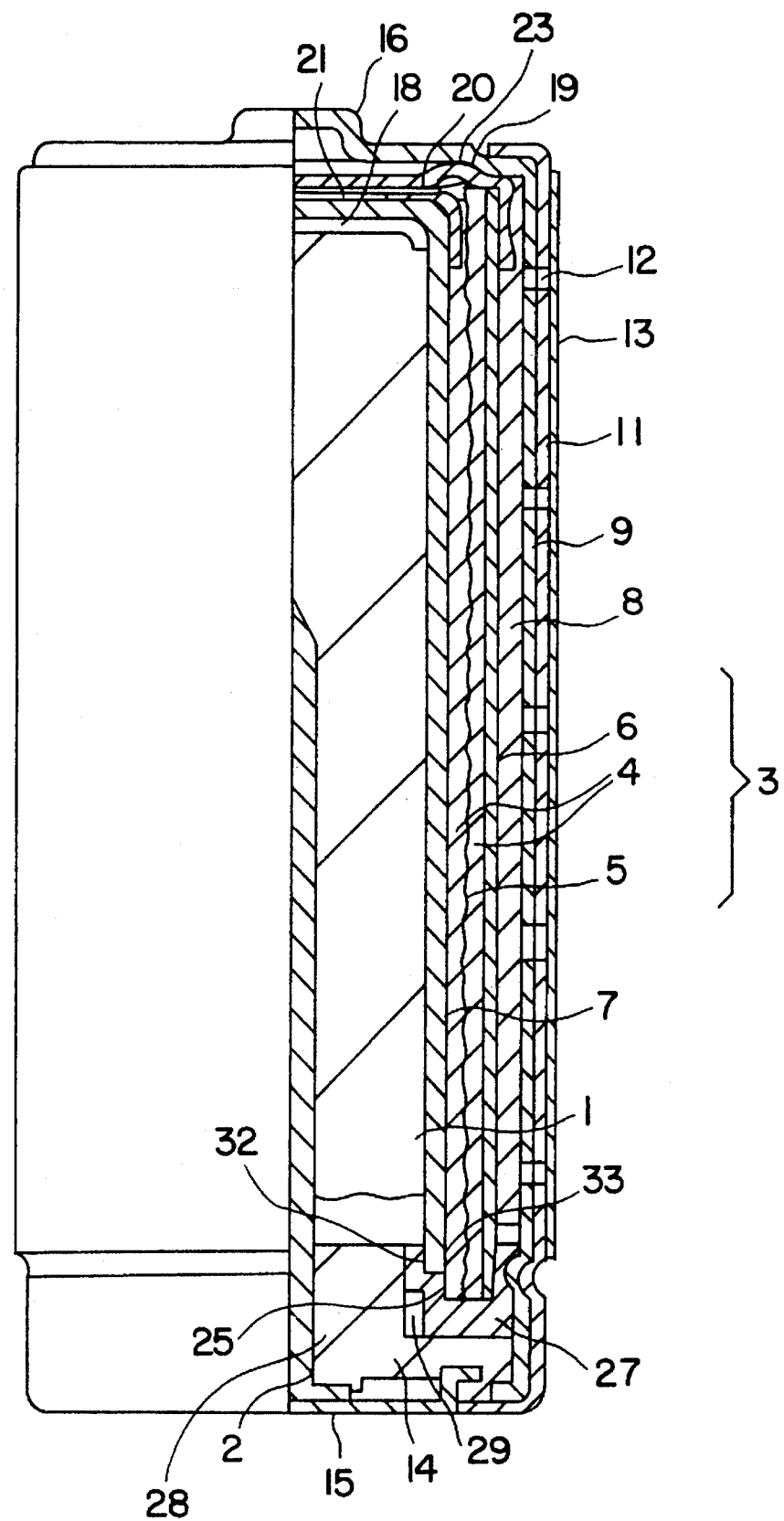
FIG. 12 shows a side view of the partly cut-off cylindrical zinc air-cell which is a sixth embodiment of the invention.

As shown in FIG. 12, a cylindrical air-cell of which top edge of positive electrode 3 have a structure shown in FIG. 6 is prepared, and this cell is specified as cell I of Embodiment-6 of the invention here. This cell I is submitted to test the same as the previously conducted one, and the result of this is shown in Table 3.

Again as shown in Table 3, no cells I showed electrolyte leakage after a three month storage test conducted at a temperature of 60° C.

Figure 13:
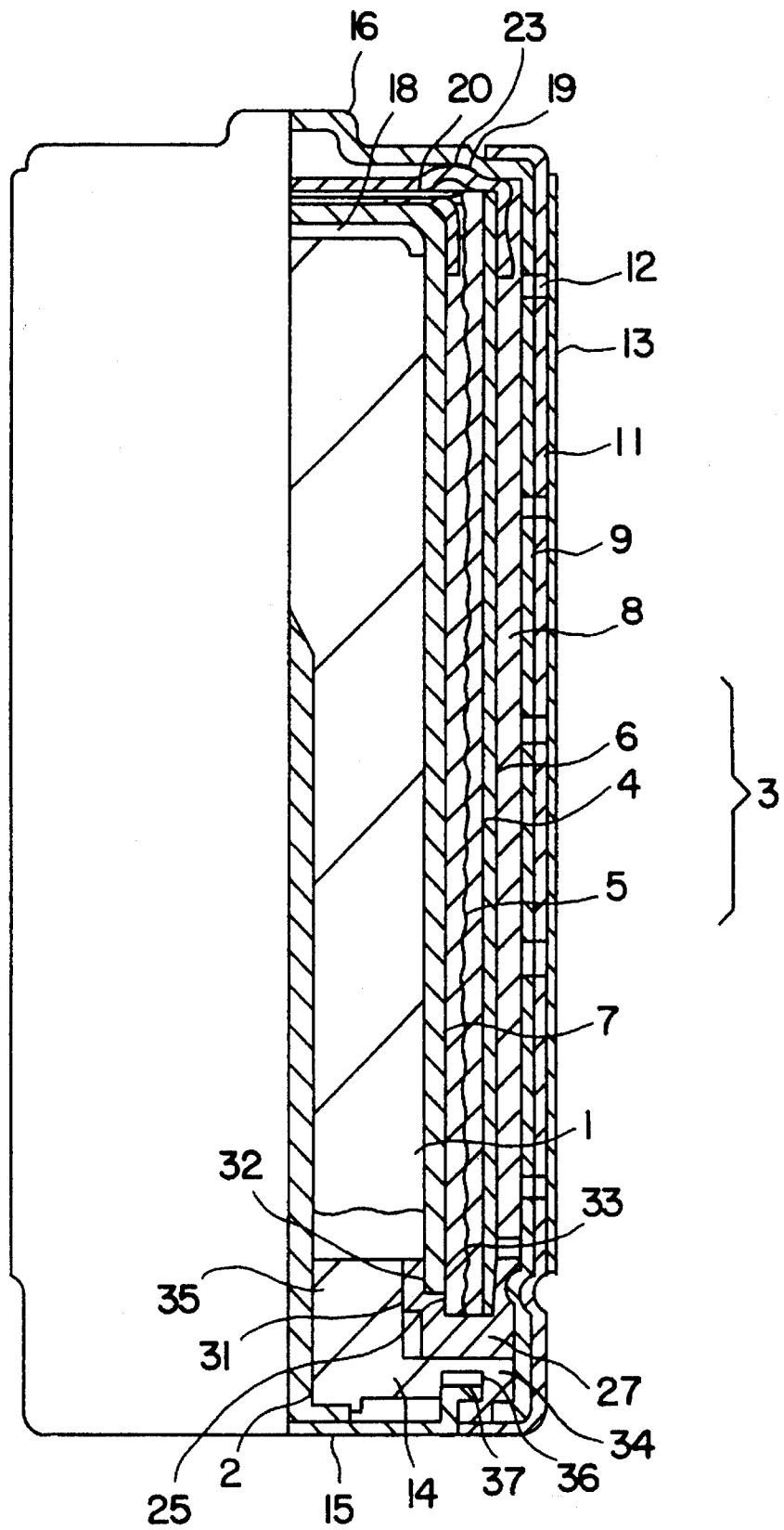
FIG. 13 shows a side view of the partly cut-off modified cylindrical zinc air-cell which is shown in FIG. 12.

Moreover, as shown in FIG. 13, although the resin mold element 28 consists of pillar shaped base 34 and pillar 35 having a diameter smaller than the base 34 disposed on the center of base 34, by providing concave part 36 at a position under base 34 and outer side of pillar 35, and by inserting metal washer 37 therein as shown, the position of resin mold element 28 can be fixed more tightly when the bottom of positive electrode canister is bent and clamped on the resin mold element 28, and thus the positive electrode canister 9 and the resin mold element can be pressed more tightly.

Although a fluororesin porous layer is disposed at the outside of positive electrode 3 in this embodiment of the invention, a better effect can be obtained by employing a gas diffusion layer made of a sheet made of acetylene-black and fluororesin powder improving the oxygen gas supply to positive electrode 3.

As above explained so far, the cylindrical air-cell of the invention consists of a metallic collector layer, a catalyst layer disposed on the side of said metallic collector layer, and a porous layer acting as a cylindrical air electrode disposed on the outside of said catalyst layer, and is provided with an outer metal cup pressed on the outer top edge of said positive electrode and an inner metal cup pressed on the inner top edge of said positive electrode. Since the top of positive electrode is pressed and clamped by said outer and inner cups, the sealing of the top of positive electrode can be substantially improved, offering air-cells having excellent sealing and leak-proof characteristics.

Moreover, by providing a bent part at the top edge of metallic collector layer, by holding and clamping said bent part against between said outer metal cup and inner metal cup, and by welding said collector layer and outer cup, the contacts between these elements can be held at a best condition, nullifying the possibility of internal resistance increase due to poor contacts between the collector layer and the outer and inner cups.

Furthermore, a resin mold body having a ring-shaped indentation fitted to the lower edge of positive electrode is disposed at the bottom of positive electrode, and after said resin mold body is inserted into the positive electrode canister, the side of said positive electrode canister is inwardly pressed against the side of said resin mold body in order to improve the sealing between the bottom of positive electrode and the ring-shaped indentation of said resin mold body, thus improving the leak-proof characteristics of the bottom of positive electrode.

What is claimed is:

1. A cylindrical air-cell provided with a cylindrical positive electrode comprised of a metallic collector layer, a catalyst layer disposed on a side wall of said metallic collector, and a porous layer disposed on an external surface of said catalyst layer, wherein an outer cap-shaped metal cup is fitted to an outer wall of an upper edge of said porous layer and an inner cap-shaped metal cup is fitted to an inner wall or an upper edge of said catalyst layer.

2. A cylindrical air-cell provided with a cylindrical positive electrode comprised of a cylindrical metallic collector layer having a bent part formed on a top edge of said collector layer by bending an upper edge of said collector layer inwardly, a catalyst layer disposed on a side wall of said metallic collector, and a porous layer disposed on the external surface of said catalyst layer, wherein an outer cap-shaped metal cup is fitted to the outer wall of an upper edge of said porous layer and an inner cap-shaped metal cup is fitted to an inner wall of an upper edge of said catalyst layer, and said bent part of said collector layer is held between said outer cup and the inner cup.

3. A cylindrical air-cell provided with a cylindrical positive electrode comprised of a cylindrical metallic collector layer having a bent part formed on a top edge of said collector layer by bending an upper edge of said collector layer inwardly, a catalyst layer disposed on the side wall of said metallic collector, a gas diffusion layer disposed on an external surface of said catalyst layer, and a porous layer disposed on an external surface of said gas diffusion layer, wherein an outer cap-shaped metal cup is fitted to an outer wall of an upper edge of said porous layer and an inner cap-shaped metal cup is fitted to an inner wall of an upper edge of said catalyst layer, and said bent part of said collector layer is held between said outer cup and the inner cup.

4. A cylindrical air-cell according to claims 1, 2 or 3 wherein said metallic collector is formed into a cylindrical form by overlapping and welding both ends of a long metal sheet selected out of metal mesh, expanded metal or punched metal sheet, and an area of said overlap is coplanar with said collector layer.

5. A cylindrical air-cell according to claims 1, 2 or 3 wherein said metallic collector is formed into a cylindrical form by overlapping and welding both ends of a long metal sheet selected out of metal mesh, expanded metal, or punched metal, and a length of said overlap is within a range from 1.3% to less than 9.0% of the total circumference of said cylindrical collector layer.

6. A cylindrical air-cell according to claims 1, 2 or 3 wherein said cylindrical metallic collector is formed by spirally weaving a single metal wire horizontally into a number of vertically disposed independent metal wires.

7. A cylindrical air-cell according to claims 1, 2, or 3 wherein said cylindrical metallic collector is formed by spirally weaving a single metal wire horizontally into a number of vertically disposed independent metal wires, and at least one of said vertical wires or said horizontal wire is a nickel plated metal wire or nickel wire.

8. A cylindrical air-cell according to claims 1, 2, or 3 wherein the inner wall of said outer metal cup is coated with a sealing agent.

9. A cylindrical air-cell according to claims 1, 2, or 3 wherein a plural protrusions are provided on the top of said outer metal cup.

10. A cylindrical air-cell according to claims 1, 2, or 3 wherein an opening is provided on the top of said inner metal cup.

11. A cylindrical air-cell according to claims 2, or 3 wherein an opening is provided at the center of said inner metal cup, and said bent part of said metallic collector layer and said outer metal cup is welded together.

12. A cylindrical air-cell according to claims 1, 2, or 3 wherein said catalyst layer includes manganese oxide and carbon material.

13. A cylindrical air-cell provided with a cylindrical positive electrode comprised of a metallic collector layer, a catalyst layer disposed on a side wall of said metallic collector, and a porous layer disposed on an external surface of said catalyst layer, wherein an outer cap-shaped metal cup is fitted to an outside wall of upper edge of said porous layer and an inner cap-shaped metal cup is fitted to an inner side wall of an upper edge of said catalyst layer, and said positive electrode equipped with a terminal part on top of said positive electrode, is housed in a cylindrical positive electrode canister, and said terminal part and said outer cup are welded together, and said outer rim of said outer cup located outside of a welded part of said terminal part and said outer cup and an inner rim surface of positive electrode canister facing to said outer rim of said outer cup is electrically insulated.

14. A cylindrical air-cell provided with a cylindrical positive electrode comprised of a cylindrical metallic collector layer having a bent part formed on a top edge of said collector layer by bending an upper edge of said collector layer inwardly, a catalyst layer disposed on a side wall of said metallic collector, and a porous layer disposed on an external surface of said catalyst layer, wherein an outer cap-shaped metal cup is fitted to an outer wall of an upper edge of said porous layer and an inner cap-shaped metal cup is fitted to an inner wall of an upper edge of said catalyst layer, and said positive electrode is housed in a cylindrical electrode canister provided with a terminal part on top of said positive electrode, and said terminal part and said outer cup are welded together, and an outer rim of said outer cup located outside of a welded part of said terminal part and said outer cup and the inner rim surface of positive electrode canister facing said outer rim of said outer cup is electrically insulated.

15. A cylindrical air-cell according to claims 13 or 14 wherein a protrusion is provided on a top of said outer metal cup and said protrusion is welded on an internal surface of said terminal of said positive electrode canister.

16. A cylindrical air-cell according to claims 13 or 14 wherein a non-woven fabric is disposed between the outer rim of the outer cup locating at an outside of a protrusion provided at a top edge of metal outer cup and an outer surface of said porous layer, and an internal surface of said positive electrode canister.

17. A cylindrical air-cell according to claims 13 or 14 wherein a heat-shrinking porous resin tube having a high air permeability is disposed between an outer rim of outer cup locating at the outside of a protrusion provided at a top edge of metal outer cup and outer surface of said porous layer, and internal surface of said positive electrode canister.

18. A cylindrical air-cell according to claims 13 or 14 wherein a heat-shrinking porous resin tube having a high air permeability is disposed between the outer rim of an outer cup locating at the outside of a protrusion provided at a top edge of said metal outer cup and an outer surface of said porous layer, and an internal surface of said positive electrode canister,and openings are provided on a side wall of a heat-shrinking resin tube.

19. A cylindrical air-cell provided with a cylindrical positive electrode comprised of a metallic collector layer, a catalyst layer disposed on a side wall of said metallic collector layer, and a layer disposed on an external surface of said catalyst layer, wherein a resin sealing body provided with a ring-shaped indentation is disposed on an edge of a positive electrode canister holding said positive electrode, and a side of said positive electrode canister is pressed against an outer sidewall of said resin sealing body.

20. A cylindrical air-cell provided with a cylindrical positive electrode comprised of a cylindrical metallic collector layer, a catalyst layer disposed on a side wall of said metallic collector layer, and a porous layer disposed on an external surface of said catalyst layer, wherein a separator is disposed on an inner surface of said positive electrode, and a resin sealing body provided with a ring-shaped indentation fitted to hold the bottoms of said positive electrode and said separator, is disposed on an edge of a positive electrode canister, and a aide of said positive electrode canister is pressed against an outer sidewall of said resin sealing body.

21. A cylindrical air-cell provided with a cylindrical positive electrode comprised of a cylindrical metallic collector layer, a catalyst layer disposed on a side wall of said metallic collector layer, and a porous layer disposed on an external surface of said catalyst layer, wherein a resin sealing body consisted of a resin mold body provided with a ring-shaped indentation fitted to a bottom of said positive electrode and another resin mold body holding said resin mold body, is disposed on an edge of a positive electrode canister in which said positive electrode is held, and a side of said positive electrode canister is pressed against an outer sidewall of said resin sealing body.

22. A cylindrical air-cell according to claims 19, 20, or 21 wherein a gas diffusion layer is disposed between the catalyst layer and the porous layer.

23. A cylindrical air-cell provided with a cylindrical positive electrode comprised of a cylindrical metallic collector layer, a catalyst layer disposed on a side wall of said metallic collector layer, and a porous layer disposed on an external surface of said catalyst layer, wherein a separator is disposed on an inner surface of said positive electrode, and a resin mold body holding both a ring-shaped resin sealing body on which a ring-shaped indentation fitted to the bottoms of said positive electrode and said separator is provided and another resin sealing body holding said resin mold body, and a side of said positive electrode canister is pressed against an outer sidewall of said resin sealing body.

24. A cylindrical air-cell according to claims 19, 20, 21 or 23 wherein said indentation of resin mold body is provided with a tapered wall spreading upward.

25. A cylindrical air-cell according to claims 19, 20, 21 or 23 wherein a synthetic rubber sealing agent is coated on said indentation of resin mold body.

26. A cylindrical air-cell according to claims 21 or 22 wherein said resin mold body is provided with a ring-shaped indentation, and said another resin mold body consists of a pillar-shaped base and a pillar having a diameter smaller than a diameter of said base, disposed on a center of said base, and said ring-shaped resin mold body is positioned on said base, and a metal washer is installed within a part of said base at an outer position of said pillar.

27. A cylindrical air-cell according to claims 21 or 22 provided with a resin sealing body on which a metal ring is installed between said resin mold and said another resin mold.

* * * * *

UNITED STATES PATENT AND TRADE MARK OFFICE
CERTIFICATE OF CORRECTION

PATENT NO.   : 5,518,834
DATED        : May 21, 1996
INVENTOR(S)  : Yoshizawa et al..

It is certified that error appears in the above-identified patent and that said Letters Patent is hereby corrected as shown below:

Column 12, line 19, "aide" should be --side--.

Signed and Sealed this

Third Day of December, 1996

Attest:

BRUCE LEHMAN

*Attesting Officer*     Commissioner of Patents and Trademarks